(12) United States Patent
Dhir et al.

(10) Patent No.: US 8,533,030 B1
(45) Date of Patent: Sep. 10, 2013

(54) IN-BOUND TELEMARKETING SYSTEM FOR PROCESSING CUSTOMER OFFERS

(75) Inventors: Nitin Dhir, Wilmington, DE (US); Ravi Kappagantu, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1811 days.

(21) Appl. No.: 10/928,181

(22) Filed: Aug. 30, 2004

(51) Int. Cl.
*G06Q 30/00* (2012.01)

(52) U.S. Cl.
USPC .......................................................... 705/14

(58) Field of Classification Search
USPC ................... 705/14; 379/220.01; 704/270.1, 704/275
See application file for complete search history.

(56) References Cited

U.S. PATENT DOCUMENTS

| | | |
|---|---|---|
| 3,316,395 A | 4/1967 | Lavin |
| 3,634,669 A | 1/1972 | Soumas et al. |
| 4,254,474 A | 3/1981 | Cooper et al. |
| 4,594,663 A | 6/1986 | Nagata et al. |
| 4,598,367 A | 7/1986 | DeFrancesco et al. |
| 4,642,768 A | 2/1987 | Roberts |
| 4,736,294 A | 4/1988 | Gill |
| 4,739,478 A | 4/1988 | Roberts |
| 4,760,604 A | 7/1988 | Cooper et al. |
| 4,812,628 A | 3/1989 | Boston et al. |
| 4,831,526 A | 5/1989 | Luchs et al. |
| 4,866,634 A | 9/1989 | Reboh et al. |
| 4,897,811 A | 1/1990 | Scofield |
| 4,914,587 A | 4/1990 | Clouse |
| 4,964,043 A | 10/1990 | Galvin |
| 5,054,096 A | 10/1991 | Beizer |
| 5,206,803 A | 4/1993 | Vitagliano et al. |
| 5,220,500 A | 6/1993 | Baird et al. |
| 5,227,874 A | 7/1993 | Von Kohom |
| 5,231,571 A | 7/1993 | D'Agostino |
| 5,239,462 A | 8/1993 | Jones et al. |
| 5,262,941 A | 11/1993 | Saladin et al. |
| 5,274,547 A | 12/1993 | Zoffel et al. |

(Continued)

OTHER PUBLICATIONS

Patton et al., Shopping for wheel on the Web, PC World, San Francisco, Oct. 1999, vol. 17, Issue 10, p. 201. 9 pages.

(Continued)

*Primary Examiner* — Saba Dagnew
(74) *Attorney, Agent, or Firm* — Hunton & Williams LLP (57) ABSTRACT

A computer-implemented system and method for processing applications for products or services based on solicited offers made to consumers are provided. A plurality of offers are communicated to a plurality of consumer recipients using a computer, each offer being identified by a solicitation identifier and an offer identifier. Offer information of said offers is stored in an offer database that further includes consumer identification information associated with the consumer recipients. A response to a specific offer is received from a specific consumer recipient at a VRU via a communication link with the specific consumer recipient. At least some offer identification data and consumer identification data is received from the specific consumer recipient at the VRU. Data received at the VRU is used to query the offer database to identify other targeted offers targeted to the specific consumer recipient and data associated with those other targeted offers, including consumer identity verification data. The identity of the specific consumer recipient is verified based on the consumer identification data and the consumer identity verification data. The communication link is transferred from the VRU to a live agent. The live agent is provided with (a) information received from the specific consumer at the VRU and (b) data from the query of the offer database including data regarding other targeted offers.

30 Claims, 3 Drawing Sheets

(56) References Cited

U.S. PATENT DOCUMENTS

| | | |
|---|---|---|
| 5,278,751 A | 1/1994 | Adiano et al. |
| 5,321,841 A | 6/1994 | East et al. |
| 5,424,938 A | 6/1995 | Wagner et al. |
| 5,444,844 A | 8/1995 | Inoue et al. |
| 5,481,647 A | 1/1996 | Brody et al. |
| 5,523,942 A | 6/1996 | Tyler et al. |
| 5,537,315 A | 7/1996 | Mitcham |
| 5,550,734 A | 8/1996 | Tarter et al. |
| 5,551,021 A | 8/1996 | Harada et al. |
| 5,606,496 A | 2/1997 | D'Agostino |
| 5,611,052 A | 3/1997 | Dykstra et al. |
| 5,644,493 A | 7/1997 | Motai et al. |
| 5,649,116 A | 7/1997 | McCoy et al. |
| 5,655,085 A | 8/1997 | Ryan et al. |
| 5,664,115 A | 9/1997 | Fraser |
| 5,689,649 A | 11/1997 | Altman et al. |
| 5,696,907 A | 12/1997 | Tom |
| 5,699,527 A | 12/1997 | Davidson |
| 5,715,402 A | 2/1998 | Popolo |
| 5,717,865 A | 2/1998 | Stratmann |
| 5,732,397 A | 3/1998 | DeTore et al. |
| 5,740,240 A * | 4/1998 | Jolissaint ........ 379/265.02 |
| 5,742,775 A | 4/1998 | King |
| 5,758,328 A | 5/1998 | Giovannoli |
| 5,765,144 A | 6/1998 | Larche |
| 5,774,882 A | 6/1998 | Keen et al. |
| 5,774,883 A | 6/1998 | Andersen et al. |
| 5,794,207 A | 8/1998 | Walker et al. |
| 5,797,133 A | 8/1998 | Jones et al. |
| 5,802,251 A * | 9/1998 | Cohen et al. ........ 704/275 |
| 5,802,502 A | 9/1998 | Gell et al. |
| 5,809,478 A | 9/1998 | Greco et al. |
| 5,815,683 A | 9/1998 | Vogler |
| 5,832,447 A | 11/1998 | Rieker et al. |
| 5,838,906 A | 11/1998 | Doyle et al. |
| 5,842,178 A | 11/1998 | Giovannoli |
| 5,844,553 A | 12/1998 | Hao et al. |
| 5,845,256 A | 12/1998 | Pescitelli et al. |
| 5,848,427 A | 12/1998 | Hyodo |
| 5,862,223 A | 1/1999 | Walker et al. |
| 5,864,604 A | 1/1999 | Moen |
| 5,870,721 A | 2/1999 | Norris |
| 5,870,723 A | 2/1999 | Pare |
| 5,873,096 A | 2/1999 | Lim |
| 5,875,437 A | 2/1999 | Atkins |
| 5,878,403 A | 3/1999 | DeFrancesco et al. |
| 5,897,621 A | 4/1999 | Boesch |
| 5,899,982 A | 5/1999 | Randle |
| 5,910,988 A | 6/1999 | Ballard |
| 5,911,135 A | 6/1999 | Atkins |
| 5,913,202 A | 6/1999 | Motoyama |
| 5,918,217 A | 6/1999 | Maggioncalda et al. |
| 5,920,848 A | 7/1999 | Schutzer et al. |
| 5,926,800 A | 7/1999 | Baronowski |
| 5,930,764 A | 7/1999 | Melchione et al. |
| 5,930,775 A | 7/1999 | McCauley et al. |
| 5,930,776 A | 7/1999 | Dykstra et al. |
| 5,940,811 A | 8/1999 | Norris |
| 5,940,812 A | 8/1999 | Tengel et al. |
| 5,963,953 A | 10/1999 | Cram et al. |
| 5,966,699 A | 10/1999 | Zandi |
| 5,970,482 A | 10/1999 | Pham |
| 5,970,483 A | 10/1999 | Evans |
| 5,983,206 A | 11/1999 | Oppenheimer |
| 5,987,434 A | 11/1999 | Libman |
| 5,987,436 A | 11/1999 | Halbrook |
| 5,991,750 A | 11/1999 | Watson |
| 5,995,947 A | 11/1999 | Fraser et al. |
| 6,012,044 A | 1/2000 | Maggioncalda |
| 6,014,645 A | 1/2000 | Cunningham |
| 6,014,646 A | 1/2000 | Vallee |
| 6,029,149 A | 2/2000 | Dykstra et al. |
| 6,032,137 A | 2/2000 | Ballard |
| 6,055,517 A | 4/2000 | Friend |
| 6,078,905 A | 6/2000 | Pich-LeWinter |
| 6,105,007 A | 8/2000 | Norris |
| 6,108,644 A | 8/2000 | Goldschlag |
| 6,128,603 A | 10/2000 | Dent |
| 6,134,530 A | 10/2000 | Bunting |
| 6,167,383 A | 12/2000 | Henson |
| 6,216,115 B1 | 4/2001 | Barrameda |
| 6,249,775 B1 | 6/2001 | Freeman |
| 6,339,766 B1 | 1/2002 | Gephart |
| 6,343,279 B1 | 1/2002 | Bissonette |
| 6,502,080 B1 | 12/2002 | Eichorst |
| 6,529,187 B1 | 3/2003 | Dickelman |
| 6,725,257 B1 | 4/2004 | Cansler |
| 6,805,287 B2 | 10/2004 | Bishop |
| 7,016,843 B2 * | 3/2006 | Fitzpatrick et al. ........ 704/270.1 |
| 7,167,553 B2 * | 1/2007 | Shaffer et al. ............ 379/220.01 |
| 2001/0011255 A1 | 8/2001 | Asay et al. |
| 2001/0042034 A1 | 11/2001 | Elliott |
| 2001/0047313 A1 | 11/2001 | Kanai |
| 2001/0047489 A1 | 11/2001 | Ito et al. |
| 2002/0013728 A1 | 1/2002 | Wilkman |
| 2002/0038363 A1 | 3/2002 | MacLean |
| 2002/0048369 A1 | 4/2002 | Ginter et al. |
| 2002/0052842 A1 | 5/2002 | Schuba et al. |
| 2002/0062285 A1 | 5/2002 | Amann et al. |
| 2002/0087468 A1 | 7/2002 | Ganesan et al. |
| 2002/0091635 A1 | 7/2002 | Dilip et al. |
| 2003/0130904 A1 * | 7/2003 | Katz et al. ........ 705/26 |
| 2003/0236740 A1 * | 12/2003 | Lang et al. ........ 705/38 |

OTHER PUBLICATIONS

Underwood et al., Editors' Pics, Star Tribune, Minneapolis, 23, Sep. 1999, 2 pages.

Shop for car, drive a hard bargain, Orlando Sentinel, Orlando, FL, Sep. 11, 1999, p. E7, 2 pages.

Little, M., Buying and selling a car online, MacAuthority, Louisville, Sep. 1999, vol. 98, Issue 9, p. 4, 7 pages.

Carlsbad, Customization and interactivity on five major automobile sites, Internet and E-Business strategies, Nov. 1999, vol. 3, Issue 11, p. 3, 2 pages.

Car Buying, new rules, new tools new prices, Consumer Reports, Yonkers, Apr. 2000, vol. 65, Issue 4, p. 15, 9 pages.

CarsDirect.com rolls out Zero-drive-off lease, Other leasing options in 39 states, Business Editors and Automotive Writes, Business Wire, New York, Mar. 6, 2000, 3 pages.

Edmunds.com named automotive resource for intuits Quicken Deluxe 2000. Business Editors, High-tech and Automotive writers, Business wire, New York, Aug. 23, 1999, 34 pages.

Armstrong, Kicking Tires on the Web, Business Week, Apr. 26, 1999, Issue 3626, p. 120E1, 3 pages.

"Toyota unveils Web initiative; Manitoba pilot project will allow online deposits" [1 Edition], Tony Van Alphen. Toronto Star. Toronto, Ont.: Mar. 2, 2000. p. 1, 2 pages.

U.S. Appl. No. 10/650,491, filed Sep. 4, 2003 by Bank One entitled "System and method for financial instrument pre-qualification and offering."

* cited by examiner

IN-BOUND TELEMARKETING SYSTEM FOR PROCESSING CUSTOMER OFFERS

RELATED APPLICATION

This application is generally related by subject matter to U.S. application Ser. No. 10/634,091 on Sep. 4, 2003 and entitled "System And Method For Financial Instrument Pre-Qualification And Offering."

FIELD OF THE INVENTION

The present invention relates to a system and method for handling in-bound telemarketing calls when a consumer responds to a targeted offer ("solicited") or a generalized marketing overture ("unsolicited").

BACKGROUND OF THE INVENTION

Financial institutions and other merchants use telemarketing to market and distribute products and services. Telemarketing can involve the telemarketer calling customers directly to market a product ("out-bound telemarketing"), and it can also involve receiving calls from customers in response to an offer or overture previously received by the customer ("in-bound telemarketing" or "IBTM"), or for other reasons the customer initiates a call to the seller. The present invention is generally directed to handling in-bound telemarketing calls when a consumer responds to a targeted offer directed specifically at the consumer ("solicited offer") or a generalized marketing overture to a plurality of individuals ("unsolicited offer"). While other merchants, products, and offerees are contemplated herein, a typical scenario involves a bank telemarketing a financial product such as a credit card or credit card-related product or service to an existing bank customer or a plurality of existing bank customers, or to a potential bank customer or plurality of potential bank customers.

It is known that solicited offers are offers which can be sent by mail, the Internet, or by out-bound telemarketing whereby a bank customer is offered a product such as a credit card. The solicited offer will usually include identifying information such as a solicitation number, an offer number, and a toll free number for the consumer to respond. Multiple offers may be extended over time to the same consumer recipient, and typically the bank maintains a database that stores solicitation numbers, offer numbers, and underlying data related to that offer, such as the consumer's name, address, etc. The database may store information that was used in extending that offer, such as any credit data, income data, and household data. Thus, looking up a solicitation number for consumer A responding to offer 1 may provide underlying information related to that offer 1. The solicitation number typically identifies the offer and solicited customer.

For solicited offers, when a caller responds by calling the bank's toll free number, the call is typically routed to a Voice Response Unit (VRU). The VRU may solicit the caller to input data, including the solicitation number and/or offer number. The VRU then accesses the internal offer database to acquire the information associated with the solicitation number, particularly the data associated with the specific offer at issue. Then the VRU issues a query to a third party credit bureau. The credit bureau applies credit decisioning rules previously supplied by the bank. The credit bureau returns an "approved" or "declined" response to the VRU. Typically, the VRU does not give the caller an immediate yes/no answer; rather, the call is then routed to a live agent. Equipped with the limited information from the VRU, the live agent denies the customer's request or approves the request and enrolls the customer in the offered financial program, product, or service. In the prior art, the live agent typically receives limited customer and transaction information from the VRU. As a result, prior art approaches to handling solicited offer responses require a significant amount of time for the live agent to collect data from the caller.

Unsolicited offers are not directed to individual consumers. While they typically include a toll free number, they do not have solicitation numbers or offer numbers. Thus, the process after initial information is collected from the caller follows the process described above, except that there is no database lookup. Instead, the approval information is determined based entirely on information received from the customer during the call.

Deficiencies exist in the conventional approaches for call processing for solicited and unsolicited offers. In both types of telemarketing, the systems and methods for identifying and verifying information provided by the customer are limited. Existing systems generally accept a customer's address without checking it against other data. In addition, voice recognition technology used by VRUs are limited in their ability to identify customer information provided in the customer's speech during the call, such as the customer's address. Further, limited information is provided to the live agent, and therefore the live agent has a limited ability to market additional products and services that may be relevant to the customer. For the solicited offers, the limited information provided to the agent also prevents the agent from following up on prior offers that may have been extended to the customer. Further, the limited information provided to the live agent undermines efficiency because the agent must collect significant information from the caller after the call is routed to the live agent.

These and other drawbacks exist with current systems and methods.

SUMMARY OF THE INVENTION

Accordingly, various embodiments of the present invention may be directed to a system and a method for processing applications for products or services based on solicited offers made to consumers. A computer-implemented system and method for processing applications for products or services based on solicited offers made to consumers are provided. A plurality of offers are communicated to a plurality of consumer recipients using a computer, each offer being identified by a solicitation identifier and an offer identifier. Offer information of said offers is stored in an offer database that further includes consumer identification information associated with the consumer recipients. A response to a specific offer is received from a specific consumer recipient at a VRU via a communication link with the specific consumer recipient. At least some offer identification data and consumer identification data is received from the specific consumer recipient at the VRU. Data received at the VRU is used to query the offer database to identify other targeted offers targeted to the specific consumer recipient and data associated with those other targeted offers, including consumer identity verification data. The identity of the specific consumer recipient is verified based on the consumer identification data and the consumer identity verification data. A request is issued to a credit bureau for an approval result returned to the VRU. The communication link is transferred from the VRU to a live agent. The live agent is provided with (a) information received from the specific consumer at the VRU, (b) data from the query of the offer database including data regarding other targeted offers, and (c) the results of the credit bureau request.

According to another embodiment of the invention, a system for processing a specific consumer recipient offer is provided. An output device communicates, using a computer, a plurality of offers to a plurality of consumer recipients, each offer being identified by a solicitation identifier and an offer identifier. A database stores offer information of said offers in an offer database that further includes consumer identification information associated with the consumer recipients. An input device receives a response to a specific offer from a specific consumer recipient at the VRU via a communication link with the specific consumer recipient. The input device also receives at least some offer identification data and consumer identification data from the specific consumer recipient at the VRU. A processor uses data received at the VRU to query the offer database to identify other offers targeted to the specific consumer recipient and data associated with those other targeted offers, including consumer identity verification data. The processor also verifies the identity of the specific consumer recipient based on the consumer identification data and the consumer identity verification data. A transfer mechanism transfers the communication link from the VRU to a live agent, wherein the live agent is provided with (a) information received from the specific consumer at the VRU and (b) data from the query of the offer database including data regarding other targeted offers.

According to another embodiment of the invention, a computer-implemented method for processing applications for products or services based on solicited offers made to consumers is provided. A plurality of offers are communicated to a plurality of consumer recipients using a computer. Offer information of said offers is stored in an offer database. A response to a specific offer from a specific consumer recipient is received at a communication processor via a communication link with the specific consumer recipient. At least some offer identification data and consumer identification data is received from the specific consumer recipient at the communication processor. Data received at the communication processor is used to query an offer database to identify other offers that may be targeted to the specific consumer recipient and data associated with those other targeted offers. The communication link is transferred from the communication processor to a live agent. The live agent is provided with (a) information received from the specific consumer at the communication processor and (b) data from the query of the offer database including data regarding other targeted offers.

According to another embodiment of the invention, a computer-readable medium encoded with computer program code to process an offer is provided. The program code effective to store specific consumer recipient data associated with a specific consumer recipient. The program code is effective to distribute an offer to the specific consumer recipient after the act of storing, wherein the offer comprises an offer identifier associated with the offer and the specific consumer recipient. The program code is effective to receive a response to the offer from the specific consumer recipient, wherein the response comprises the offer identifier. The program code is effective to identify the stored specific consumer recipient data based on the offer identifier. The program code is effective to pass the stored specific consumer recipient data to a live agent. The program code is also effective to determine an offer result.

According to another embodiment of the invention, a method for processing a customer offer is provided. An offer is distributed to a customer. A response to the offer is received from the customer through a customer communication device, wherein the response comprises customer address information. The location of the customer communication device is automatically identified. The customer address information is verified based on the location of the customer communication device.

Other embodiments are also within the scope of the invention.

DETAILED DESCRIPTION OF EXEMPLARY EMBODIMENTS

The embodiments described herein solve many problems with existing systems and methods. In some embodiments, customer information such as home address can be identified and verified using voice recognition technology, automatic number identification, GPS technology, and other technologies.

In some embodiments, previously stored customer information, newly received customer information, and credit bureau results are all available to the live agent during the call. Based on all of this information, additional offers (e.g., cross-selling) may be made to the customer that are relevant to the customer. In these embodiments, the live agent may have more information to inform a decision to approve a customer for a given product or service, such as a credit card product. This leads to more accurate approvals and therefore higher profits, since inaccurate approvals can cause losses to the bank when an unqualified customer defaults on a payment, for instance. In these embodiments, the live agent also has more information for selecting additional offers appropriate to the customer.

According to another embodiment of the invention, the internal offer database lookup retrieves all offers (i.e., for all offer numbers) extended to that caller rather than the single offer that prompted the customer's response. This gives the live agent a full history of the offers extended to that consumer so that the live agent can make fully informed decisions on the present offer and for renewing or otherwise revisiting other offers, such as offers previously extended to that customer.

OVERVIEW AND SYSTEM ILLUSTRATION

Figure 1:
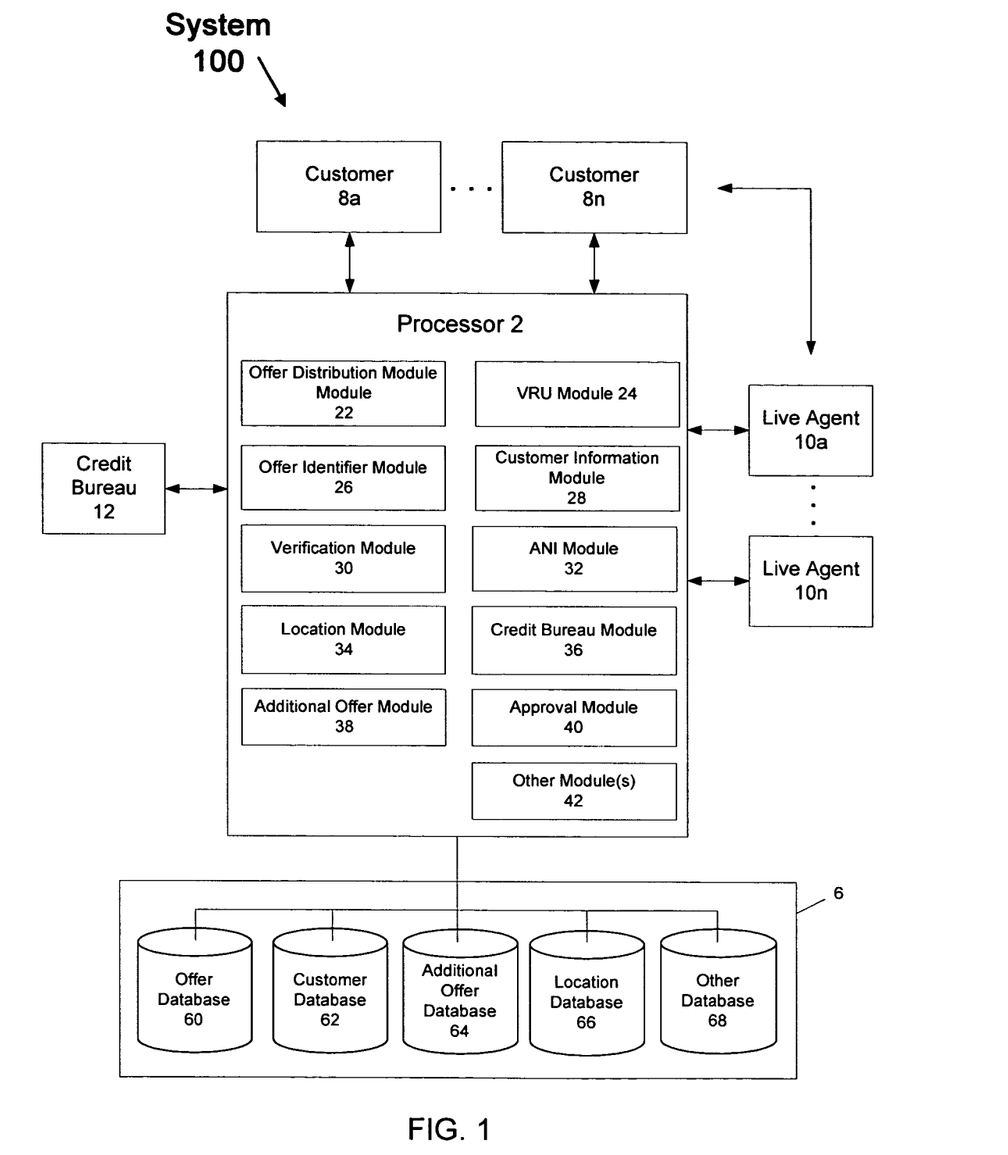
FIG. 1 depicts a system for processing an offer according to an embodiment of the invention.

According to one exemplary embodiment as depicted in FIG. 1, the system comprises a processor 2 that communicates with one or more customers 8a-8n, a credit bureau 12, and one or more live agents 10a-10n. The processor 2 may also be coupled to a database 6.

The customers 8 may comprise potential customers of financial products, such as offerees who have received a financial product solicitation. For instance, a customer 8a may be an individual person (or other entity such as a corporation) who has received an offer to obtain a product such as a credit card. Another customer 8b may be an individual person who has received an offer to obtain a specific stored value card product. Another customer 8c may be an individual who received an offer to refinance a home and another offer to obtain a credit card sponsored by a particular retailer. Other customers 8*d*-8*f* may not receive any specific offer.

Live agents 10*a*-10*n* may be live persons associated with the processor 2 who communicate with the processor 2. The live agents 10 may also communicate with customers 8, either directly, or indirectly through the processor 2. Accordingly, it should be appreciated that the processor may receive information from the customer 8 (and/or communicate information to the customer 8) directly, or indirectly through a live agent 10. Offer information may be communicated between and among the live agents 10, customers 8, processor 2, and database 6. The communication between and among these elements may be via any suitable communication system or network. For instance, the communication may be via telephone, email, Internet, wireless network, or other means of communication. Accordingly, the customer may use a telephone, PDA, text messaging device, computer, processor, or other communication device to communicate with the processor 2 and/or live agents 10.

The credit bureau 12 may process customer 8 information and determine one or more credit scores for one or more customers 8. In determining a credit score or other information, the credit bureau 12 may access and process credit history and other credit information associated with a specific customer 8*a*. The credit bureau 12 may pass the credit scores to the processor 2 and/or one or more live agents 12. According to one embodiment, processor 2 may be operated by a financial services provider, such as a bank, and credit bureau 12 may be a third party performing credit processing based on bank-supplied decisioning rules.

The processor 2 may comprise a processor, server, hub, intranet, voice response unit (VRU), computer, network, and/or other processing element. For instance, the processor 2 may comprise a credit card offer processing system. The processor 2 may also comprise a computer system that handles the enrollment and maintenance of financial accounts such as credit card accounts and bank accounts. For instance, the processor may comprise a bank computer system. The processor 2 may comprise input and output devices for communicating with database 6, customers 8, live agents 10, and credit bureau 12.

According to the exemplary embodiment, processor 2 includes offer distribution module 22, VRU module 24, offer identifier module 26, customer information module 28, verification module 30, ANI module 32, location module 34, credit bureau module 36, additional offer module 38, approval module 40, and other module(s) 42. Further, details of these exemplary modules in processor 2 are described below.

The database 6, sometimes referred to herein as the "internal offer database," may store information, such as information received from the processor 2, live agent 10, customer 8, and credit bureau 12. The database 6 may be part of the processor 2 or it may be coupled to the processor 2. The database 6 may comprise a plurality of databases 60-68. According to one embodiment, database 6 includes the following database modules: offer database 60, customer database 62, additional offer database 64, location database 66, and other database 68.

Offer database 60 may store offer information, such as offer terms and features, offer identifiers corresponding to one or more offers, solicitation numbers, and customer data. Offer database 60 may include credit score data that was used in extending an offer. An offer may comprise an offer for the consumer to apply for (or purchase) a financial product (e.g., a certificate of deposit, a stored value card such as a gift card, a credit card, etc.), establish an account (such as a credit card account, checking account, savings account, etc.), or otherwise establish a relationship with a financial entity (obtain a loan or other financing arrangement, enroll in a program such as a rewards program or travel benefit program, obtain account protection, expand a current account or program, etc.), banking online, small business accounts, mutual funds, stock broker relationships, or it may comprise any other kind of merchant and/or bank offer. Other offers may be contemplated herein. One or more offers (each identified by an offer identifier) may be distributed to a customer 8*a* in a solicitation (identified by a solicitation number). It should be understood that, as used herein, the term "offer" is to be broadly construed to mean a targeted or untargeted solicitation for the consumer to apply for (or purchase) a product or service. Though referred to herein as offers, not all such overtures are offers in the contractual sense since they are not necessarily legally binding upon mere consumer acceptance.

The database 60 may associate each solicitation number with one or more specific offers and one or more specific customers 8. Thus, a single solicitation identifier may associate a single offer with a single customer 8 who received the offer. Alternately, a single solicitation may associate a plurality of offers with a single customer 8*a* who received the offers. The database may also store information describing the offer and customer, such as the type of financial product and the name and/or address the customer. As used herein, an "offer identifier" refers to any identifier relating to an offer, such as a solicitation identifier or an "offer identifier" as described above.

Offer database 60 may store information describing each offer, such as the expiration time of the offer, the customer 8 qualifications necessary for obtaining the offered product or service, and other offer features. The offer database 60 may also store information about the offered product or service, including the term of the product or service, the cost of the product or service, business rules governing the product or service, and other features associated with the product or service.

Database 60 may also store other offer information and customer information, such as customer information associated with the offer information. For instance, an offer identifier may comprise an identifier (e.g., "ABC123") that is uniquely matched with a specific offer, such as an offer to obtain a platinum Visa credit card sponsored by SponsorCo and issued by BankCo.

Offer database 60 may also store information associating one or more specific offers (and offer identifiers) with one or more specific customers 8*a*-8*n*. For instance, offer identifiers ABC123 and XYZ789 may be associated with specific customer 8*a*. In another embodiment, offer identifiers ABC123 and XYZ789 may both be associated with more than one customer, such as customers 8*a*-8*g*. The identifier-customer 8 associations may correspond to offers that are distributed to a specific customer 8*a* or groups of customers 8.

Customer database 62 may store customer 8 information. Customer 8 information may comprise any of the following types of information: name, address, birth date, social security number, credit score, income, job status, time at current residence, past residence information, password, PIN, accounts, associated offers, associated financial or other products, and other personal or financial information. For instance, a customer 8*a* may utilize several different financial products and services offered by a specific bank. The customer database 62 may store information related to those accounts and services, such as the amount of activity on a specific account or the last time a customer used a particular service.

Customer database 62 may also store customer voice information, such as information regarding the speech patterns of a customer. This information may enable the processor 2 to subsequently identify the customer by the speech patterns.

Customer database 62 may also store customer preference information. This information may include information regarding social and/or economic data related to the customer, such as the customer's purchasing history and residence preferences, customer selections on a merchant web page, words spoken (or other inputs) by the customer in prior phone calls or communications with the merchant, prior requests made by the customer, and other customer-related data. For instance, the database 62 may store a list of purchases made by the customer using a particular bank credit card.

Additional offer database 64 may store information about one or more offers that may be provided to one or more customers 8. The database 64 may store information relating to any of the following: one or more offers associated with a particular customer, such as an offer for which the particular customer 8a is pre-qualified (or is not pre-qualified), or for which the customer has a high likelihood of approval; terms and conditions of offers (such as offers associated with pre-approved customers); and one or more offers which may be of special interest to a specific customer 8a based on customer preference data, customer behavior data, or other customer data. The database 64 may also store a list of offers previously made to a customer.

The additional offer database 64 may also store business rules that determine which offers and/or types of offers may be provided to one or more customers 8 or types of customers. For instance, database 64 may store information indicating that offer X should only be provided to customers 8 who have an existing credit card account with a particular bank. It may also determine that a financial account product that includes a free DVD player should be provided to customers who have purchased over $1000 of home theater equipment in a one-month period within the past year.

Generally, additional offer database 64 may be used to generate new solicited offers to be distributed in the usual fashion, or to generate "cross-sell" offers made when a caller calls in response to a different offer.

Location database 66 may store location information. The location information may comprise a list of streets or other address information within a particular area code or zip code. The location module 34 may access the location database to identify the names of streets that are located in a specific zip code provided by a customer 8. The location module 34 may also identify the names of streets in or near the identified zip code or area code. The location database may also store other customer, offer, and financial-related location information.

Other database(s) 68 may store other information relating to the customers 8, live agents 10, credit bureau 12, and processor 2.

It should be understood that each of the plurality of databases 60-68 may store information linked to information in other databases 60-68. For instance, the offer database 60 may store information that links a specific offer with customer information in the customer database 62.

The processor 2 may comprise a plurality of modules 22-42. Each module may comprise a computer or other processor, including one or more input and output devices. The processor 2 may accordingly be a system comprising a plurality of computer systems linked together on a network. Thus, a person of ordinary skill in the art will recognize that the various modules can be implemented on a single computer device, or across multiple computer devices.

The modules which communicate with a customer may be equipped with voice recognition devices to distill words from the speech of the customer. These modules may also employ various other well-known methods to obtain information from the customer. For instance, these modules may use a VRU (voice response unit) to prompt for information and receive information from the customer.

Offer distribution module 22 may process offer data and customer data and cause offers to be distributed to one or more customers 8. Offer distribution module 22 may apply offer business rules stored in the offer database 60 to create a population of customer 8 offerees who will receive the offer in a solicitation. Offer distribution module 22 may rely on credit score data from credit bureau 12 in creating these or other offers.

The offer distribution module 22 may also comprise an output apparatus for passing offers to customer 8. For instance, module 22 may comprise a printer to print written offers (e.g., mail solicitations), an electronic output device to send emails, text messages, or other electronic messages to customer 8, automatic dialing device to automatically dial customer phones, and/or an output device for passing a request to a live agent 10 to provide one or more offers to one or more customers 8.

The VRU module 24 may comprise an automated telephone system such as a voice response unit (VRU). The VRU may perform any of the following functions: receive customer 8 phone calls; prompt customers 8 for customer information and offer information; receive customer 8 and offer information; and pass information to the processor 2 and/or to one or more live agents 10. Preferably, the module 24 receives the information over the phone. However, with appropriate interfaces and/or interface adapters well known to an artisan of ordinary skill, the module 24 may receive the information over the phone, email, text messaging, the Internet (e.g., via VOW), a direct data connection, or other means. The information may be received in encrypted form, and the VRU module 24 may have a de-encryption device to decode the information.

The VRU module 24 may comprise a typical bank VRU system for receiving responses to offers such as credit card offers. The VRU module 24 may also comprise a server for accomplishing the above functions over the Internet. For instance, the VRU module 24 may comprise a website of a bank (e.g., a website that does not use an actual VRU).

Offer identifier module 26 may identify offers and offer identifiers, e.g., offer identifiers received from customers 8. For instance, a customer 8 may provide an offer identifier to the processor 2 (i.e., to the VRU module 24) or to a live agent 10, and the offer identifier module 26 may identify the offer identifier and then access the offer database 60 to identify any offers associated with the offer identifier. The offer identifier module 26 may also determine whether a particular customer 8a (e.g., the customer 8a who provides the offer identifier) is associated with the offer (and/or the offer identifier). In this way, the offer identifier module 26 may determine whether a specific customer 8a was an intended (or valid) recipient of a specific offer.

Customer information module 28 may identify a customer 8 and receive, identify, access, and store customer 8 information. For instance, when the processor 2 receives information from a customer 8a, the customer information module 28 may process the information and store it in the customer database 62. Customer information may comprise any of the following information related to the customer: name, address, time at current address, email address, social security number, mother's maiden name, income (e.g., personal or household), asset information (e.g., existence of or amount in checking or savings account, or value of investments or holdings), housing payment information (e.g., monthly rental or mortgage payment), employment history, current employment status, time at current employment, credit score (or other credit data), address history, work address, home and/or work phone number, benefit information, date of birth, number of dependents, and/or other customer information. Customer information may also comprise customer preference and behavior information, such as credit card purchase activity. Customer information may also comprise all of the products and services (e.g., provided by the merchant/bank) that are presently or have been used by the customer, and it may also include a list of prior and current offers made by the merchant to the customer.

The bank or processor 2 may obtain this information in the regular course of business as the bank obtains information from its customers 8. The information may also be obtained (and verified) during a telemarketing call, as described in FIGS. 2 and 3.

The module 28 may comprise voice recognition processors and software used to identify words spoken by the customer 8*a*, e.g., words spoken over the phone to the VRU module 24. Thus, if the customer 8*a* speaks an address in response to a prompt to provide the address, the module 28 may determine the words spoken by the customer and identify the address, e.g., "123 N. Main Street, Centerville, Ind., zip code 47330."

The voice recognition technology may use different algorithms to distill words from caller speech depending on the location of the caller. For instance, the voice recognition technology may use one algorithm to interpret speech from callers in one city or region, and another algorithm may be used for callers in another city or country, where a different dialect or language is used. For instance, callers in the Southern United States may have different speech patterns for words (and they may use different types of words) compared with callers in New York City.

Verification module 30 may verify customer information, such as customer information stored in the customer database 62. For instance, personal information of an existing bank customer 8*a* may be stored in the customer database 62. The customer 8*a* may respond to an offer by calling the VRU module 24 at the processor 2. The VRU module 24 may prompt the customer 8*a* for personal information such as mother's maiden name and social security number, and the customer 8*a* may provide such information to the VRU. The verification module 30 may then access the customer database 62 to verify that the provided name and social security number match those on record for that customer 8*a* in the customer database 62. In this way, the verification module 30 may verify that the customer 8*a* is indeed providing the information, since it is unlikely that another person would know the customer's information. Verification module 30 may also verify information received by other means, such as information received or otherwise processed by the other modules 22-42. The verification module 30 may accordingly satisfy a security purpose.

Verification module 30 may also verify the identity of a customer using voice recognition processors and comparing received voice information to voice information stored in the customer database 62. Verification module 30 may also verify a customer's phone number, e.g., by comparing a phone number for the customer stored in the customer database 62 with a number identified by the ANI module 32.

ANI module 32 may verify customer information. For instance, the ANI module 32 may use automatic number identification ("ANI") methods and devices to identify the phone number from which a specific customer 8*a* calls the processor 2. For instance, the ANI module 32 may use a "caller ID" device as well-known in the art. The ANI module may also identify other customer-related information, e.g., if the customer 8*a* contacts the processor 2 over the Internet. For instance, the processor 2 may identify the IP address of the customer 8*a*, or cookie from a previous contact.

Based on the phone number and/or IP address, the ANI module may identify other information, such as personal information associated with the IP address (e.g., the name and/or address a person who has an account with the Internet or telephone service provider through which the customer 8*a* accesses the processor 2). Although the customer 8*a* may not be the person who has the account, the customer 8*a* may be related to that person, have the same address, or otherwise have personal information that is related to the personal information identified by the ANI module 32.

Location module 34 may identify the location of a customer 8*a* who is accessing the processor 2. Location module 34 may use GPS and/or "iidigits" technology to identify the general location of caller (or the caller's phone, e.g., if the phone is equipped with a GPS device). The location module 34 may also receive customer location information (such as a zip code) after prompting the customer for such information. From the zip code or other address or location information, the location module 34 may identify one or more (or all of) the streets in this zip code or location, e.g., by accessing the location database 66. The customer could then be prompted to provide a street address, which could be matched with the zip code-derived subset of street results.

Credit bureau module 36 may pass information to (and receive information from) a credit bureau 12, such as customer and offer information. For instance, the credit bureau module 36 may pass personal customer information to the credit bureau 12 and receive a credit score from the credit bureau 12. The module 36 may provide the credit bureau 12 with business rules, such as rules that define or interpret a customer credit score. The module 36 may also implement such rules. For instance, the module 36 may determine that customers having an income below a certain threshold lose five points on their credit score, and it may pass this rule to the credit bureau 12. The module 36 may also determine credit score thresholds and other criteria for various financial products. For instance, the module 36 may determine that customers 8 are eligible for a titanium-level credit card if they have a credit score above 700.

Additional offer module 38 may select additional offers to provide to one or more customers 8. The selected offers may be provided to customers 8 by a live agent 10*a* or by the module 38.

Approval module 40 may approve (and/or pre-approve) one or more customers 8 for one or more offers, products, and/or services. For instance, the approval module 40 may process customer information, such as a customer's income, credit history, and/or credit score (e.g., a score received from the credit bureau 12) to determine whether a particular customer 8*a* is approved for a platinum credit card. The approval module 40 may also determine a credit limit, reward program, and any other feature associated with the product. The approval module 40 may determine these and other features based on customer information and/or approval information. The approval information may be stored in the customer database 62. For instance, the approval module may pre-approve customers 8 for a particular financial product based on customer income information and store this information in the customer database 62.

Other module(s) 42 may perform other functions.

It should be understood that the server, processors, and modules described herein may perform their described functions automatically or via an automated system. As used herein, the term "automatically" refers to an action being performed by any machine-executable process, e.g., a process that does not require human intervention or input.

Illustrative Process

Figure 2:
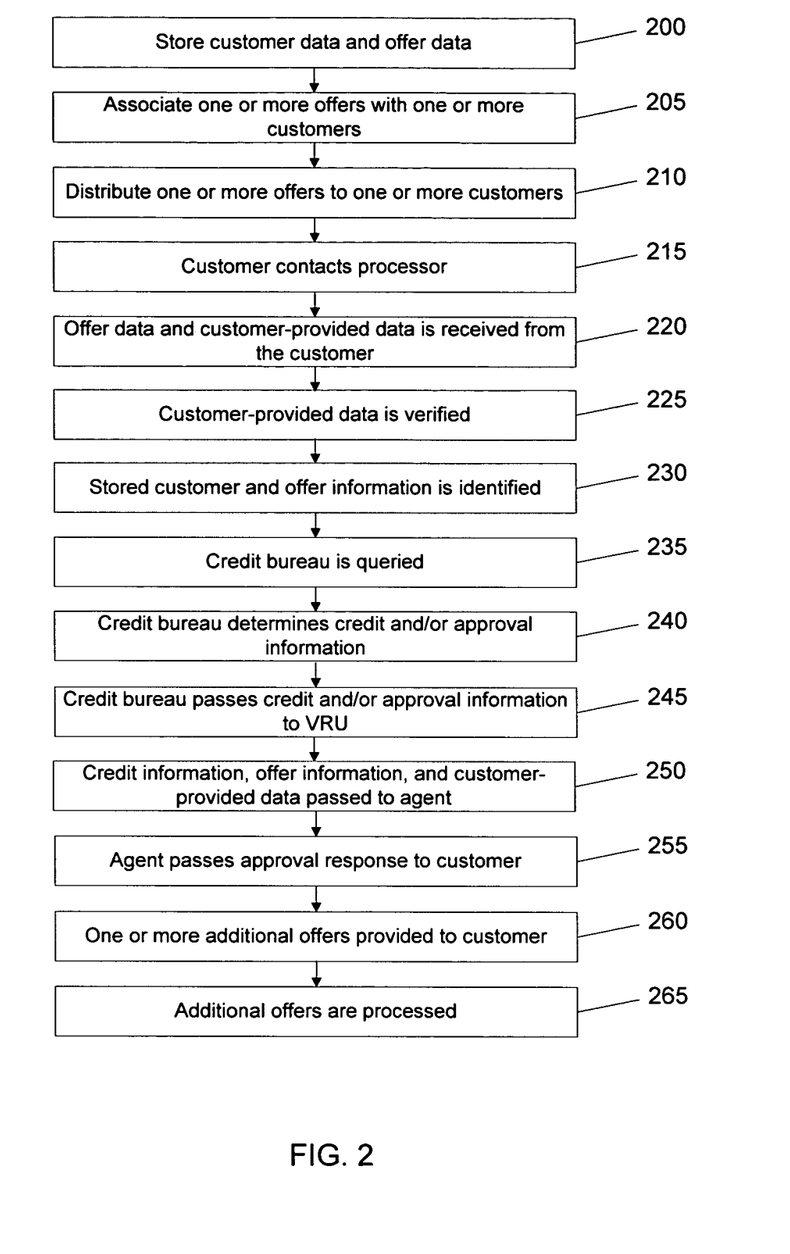
FIG. 2 depicts a flow-chart for processing a solicited offer according to an embodiment of the invention.

FIG. 2 depicts a flow-chart for processing a solicited offer according to an embodiment of the invention.

In block 200 of FIG. 2, customer data and/or offer data is stored. For instance, personal information associated with bank customers 8 (or other consumers) may be stored. The customer information may comprise the name, address, social security number, income, employment history, credit score (or other credit data), address history, or other customer information. The bank may obtain this information in the regular course of business as it obtains information from its customers 8, for instance. The bank may obtain this information from other sources, such as public records, credit bureaus, and other databases accessible to the merchant.

The offer data may comprise information relating to one or more offers that may be distributed to one or more customers in block 210. The offer data may comprise information about the offered product and/or service such as the terms and provisions of the offer, and it may also comprise offer identifiers. The offer identifiers may be associated with one or more customers, and the association information may also be stored.

In block 205, one or more offers are associated with one or more customers 8. In some embodiments, an offer is associated with a customer 8a who will receive the offer. This associating action may be prior to distributing the offers to the customers.

For instance, the offer distribution module 22 may email (and/or print) a plurality of solicitations and cause them to be delivered to the email address (or physical address) of one or more customers, or delivered through an automated outbound telephone call.

In block 210, one or more offers are distributed to the one or more customers 8. For instance, an offer may be emailed to a bank customer or mailed to the physical address of a person who has transacted with a bank partner. The offer may include key terms of the offer, an offer number, and a solicitation number. The offer may also include instructions for contacting the merchant bank (or processor or call center associated with the bank). For instance, the offer may include a website, an 800 number, an address, and/or other information needed for contacting the bank.

In block 215, a customer may contact the processor, such as via a website or VRU (e.g., VRU module 24). For instance, the customer may call an 800 number provided with the offer. The 800 number may direct the caller to a call center comprising one or more processors, live agents, and VRUs. The customer may be immediately transferred to a live agent, or the customer's call may be answered by a live agent. Preferably, the customer's call is directed to a VRU (e.g., VRU module 24).

While a VRU is described for this exemplary embodiment, it should be understood that a live agent or other processing element may communicate with the customer in addition to the VRU. For example, it should be understood that an 800 number (provided with the offer) may direct the offeree/customer/caller to a call center comprising one or more processors, live agents, and VRUs. Further, the customer may contact the processor over the internet or other networked means rather than via a VRU. The caller may be transferred between and among the various components of the call center throughout the call. However, the preferred approach is that the customer is routed immediately, or eventually, to a VRU or other automated device so that certain information can be collected from the customer before routing to a live agent for disposition of the application.

In block 220, customer-provided data such as offer data may be received, e.g., by a live agent, VRU or other processing element. For instance, the processor may prompt the caller for information, and the customer may provide the requested information. The requested information may comprise one or more offer identifiers, one or more solicitation identifiers, other offer information, caller name, caller address, and other caller information as described above.

The VRU may receive the information over the phone, or, with appropriate interface circuitry, a VRU, email, text messaging, the Internet (e.g., via VOW), a direct data connection, or other means. The information may be received in encrypted form, and the VRU may have a decryption device to decode the information.

The customer may provide such information through any variety of means. The customer may speak the information (e.g., in response to prompts from the VRU or live agent), enter text responses via a keypad or keyboard, or otherwise convey the information to the processor (either directly or indirectly through the live agent). For instance, the customer may use touchtone inputs on a phone.

In block 225, the customer-provided information may be verified (e.g., by the processor or a live agent). The information may be verified as it is received (on an ongoing basis), or it may be verified at another time, such as after all personal information has been received from the customer. To verify the information, the processor may compare the received information with stored information about the customer (and/or offer). For instance, the processor may prompt the customer to speak the name of the customer's mother's maiden name and may accordingly receive speech information corresponding to the mother's maiden name. The processor may identify the mother's maiden name from the received speech information. The processor may then access the customer database to determine whether the identified name matches the mother's maiden name stored for that customer in the customer database 62.

The processor may also verify the identity of the customer by checking this information. Further, if voice information has previously been stored for the customer, the processor may compare the voice information (e.g., speech patterns and timbre) with current voice information received and processed during the call. It should be appreciated that this may only be accomplished when the customer's voice is received, e.g., on a phone call. In some embodiments, the processor may prompt the customer for a PIN, password, or other code in order to verify the identity of the caller/customer.

In block 230, stored customer and offer information may be identified, e.g., by the processor. For instance, the VRU module 24 and/or verification module 30 may use voice recognition software to identify the solicitation identifier, offer identifier, and personal information of the customer based on the customer's responses to requests for that information. The stored customer data may be data stored in block 200 and/or received at block 220, and the offer information may be information received at block 220.

In block 235, the VRU may pass a query to a credit bureau, e.g., a query for a credit score. The query may comprise customer and offer information. For instance, the query may comprise information received from the customer such as income, employment history, and residence history. If needed, customer approval to obtain a credit report may be requested prior to querying the credit bureau.

In block 240, the credit bureau may determine approval information, such as a credit score of the customer. In determining the approval information, the credit bureau may access and process credit history or other creditworthiness information of the customer. The credit bureau may also apply business rules provided by the bank to process the customer's personal information (such as income and employment history) and credit history information in order to determine a credit score or other approval information.

In block 245, the credit bureau may pass credit and/or approval information such as the consumer's credit score to the processor (or live agent or other entity). As used herein, "customer approval information" may comprise approval information, denial information, or a response that requests additional data or processing. The credit information may comprise information used in determining whether to approve the customer for the offered product or service. The approval information may comprise a determination of creditworthiness, either generally or in specific relation to the offered product.

In block 250, credit information (e.g., credit score), offer information (e.g., the current offer or additional offers for which the customer is approved), and customer-provided information (e.g., name and income) may be passed to the processor and/or a live agent. For instance, the processor (e.g., the VRU) may transfer the call to a live agent after receiving information from the customer, credit bureau, and modules and databases. The credit, offer, and customer-provided information may be all or a portion of the information received from (or processed by) the credit bureau, processor and databases, and customer in any of the above-described blocks. When the call is transferred, the VRU may pass the above-described information to the live agent, e.g., by populating the information on the live agent's computer screen. At this point, the merchant bank may have sufficient information to determine whether to approve the customer for the offered product or service.

It will be appreciated by those skilled in the art that passing the credit, offer, and customer-provided information to the live agent, the live agent is able to make final approval determination (e.g., as described in block 255) and/or provide additional offers (e.g., related offers or cross-selling) based on the more thorough and accurate information than if the live agent did not have this information. In prior art systems and methods, the live agent did not receive all of this information from the VRU.

In block 255, the live agent (or processor) passes an approval response (or other offer result such as a denial or a request/requirement for further data or processing) to the customer. For instance, the live agent (or processor) may determine whether to approve the customer for the offered product or service based on the offer information, customer information, and customer credit score. Alternately, another entity such as the processor may determine a final approval status. (It should be appreciated that "approval status" is meant to include approval, denial, or another category such as hold, need additional information, or qualified approval.)

If the customer is approved, the agent (or processor) may notify the customer of the approval (e.g., by indicating approval over the phone). The bank (or other provider) may then provide the product or service to the customer or enroll the customer in the offered program, or otherwise take steps towards providing the offered product or service to the customer. For instance, the processor may cause the offered credit card to be mailed to the customer. If the customer is not approved, the customer may indicate the disapproval. In either case, the agent may offer additional products and/or services to the customer.

In block 260, one or more additional offers may be provided to the customer. These may be offers that are stored in the additional offer database. The offers may comprise one or more offers for which the customer is pre-approved. These offers may also be provided to the customer based on customer preferences and other information. For instance, if the customer may be offered products and services based on the location of the customer, e.g., a location identified by ANI, caller ID, GPS, or other means. For instance, if the customer is identified to be calling from a state other than the customer's home state, the bank may presume that the customer is traveling and accordingly offer the customer a frequent flyer rewards program as a tie-in to a current credit card enrollment.

In block 265, the additional offers of block 260 are processed. For instance, the customer may be enrolled in a credit card rewards program, or the customer may open a new checking account.

Another Illustrative Process

Figure 3:
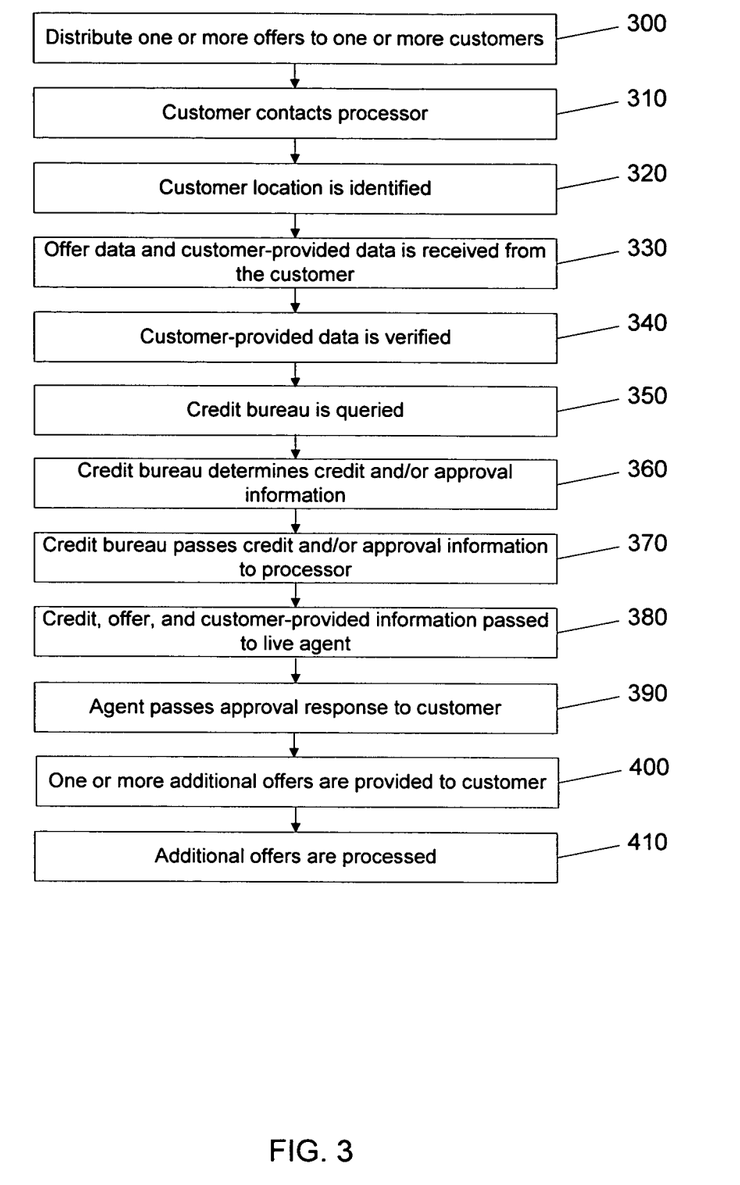
FIG. 3 depicts a flow-chart for processing an unsolicited offer according to an embodiment of the invention.

FIG. 3 depicts a flow-chart for processing an unsolicited offer according to an embodiment of the invention. Because an unsolicited offer may not involve an offer or solicitation identifier, the exemplary process for an unsolicited offer is different from the exemplary process for a solicited offer.

Blocks 300-310 and 350-410 of FIG. 3 may occur as described for corresponding blocks 215-220 and 235-265 of FIG. 2, respectively.

In block 320 of FIG. 3, the customer's location may be identified, e.g., by ANI, caller ID, GPS, or other means. For instance, in some embodiments, the caller is prompted for a name and address. Speech recognition (or alternatively, touchtone input) may be used to identify a zip code input by the caller (e.g., by voice or text). The processor may then access the location database 66 and identify all the streets corresponding to that zip code. The caller may then input a street address, e.g., by voice. The processor may identify a street address based on voice recognition and compare this address to the subset of street results from the database. In this way, the processor can confirm the customer's street address. The address extracted from the caller's input could also be compared to the address identified by ANI/Caller ID information for security purposes.

In block 330, customer-provided data such as offer data is received, e.g., from the customer by a live agent, VRU, or other processing element. This action may occur as described for block 220 above, however, an offer identifier and solicitation identifier may not be involved. Rather, other offer and customer information may be received, e.g., in response to prompts by the processor or agent.

In block 340, customer-provided data is verified. For instance, the customer's address may be verified as described above in block 225. Credit information may be received from the credit bureau (e.g., in block 370), and the credit information may enable the processor to verify that the customer's name matches a provided social security number. Other databases and modules may be queried to identify information associated with the customer. For instance, phone book databases, Internet databases, employment databases, and other records can be used to verify customer information.

If the customer is a pre-existing bank customer, then the information may be verified as described above in the description of block 225.

Thus, the exemplary method described herein for the solicited and unsolicited approaches differs because the unsolicited approach does not use offer identifiers and solicitation identifiers. It should be appreciated that an unsolicited offer response may be received from a bank customer or other familiar person for which information is already stored, as in the exemplary solicited offer approach. In this scenario, an unsolicited offer may be processed in a manner very similar to that of the solicited approach described above.

It should be appreciated that the embodiments described in FIGS. 2 and 3 involve actions that need not be performed in the order presented herein, nor must all of the actions be performed. Also, some of the actions may be performed more than once. For instance, information may be verified as it is received, and the credit bureau may be queried immediately upon receiving the customer's social security number.

The embodiments of the present inventions are not to be limited in scope by the specific embodiments described herein. For example, although many of the embodiments disclosed herein have been described with reference to banks and telephone telemarketing, the principles herein are equally applicable to other merchants and other methods of processing offers, e.g., processing offers on the Internet. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A computer-implemented method for processing applications for products or services based on solicited offers made to consumers, comprising:

communicating, using a computer, a plurality of offers to a plurality of consumer recipients, each offer being identified by a solicitation identifier and an offer identifier;

storing offer information of said offers in an offer database that further includes consumer identification information associated with the consumer recipients;

receiving a response to a specific offer from a specific consumer recipient at a VRU via a communication link with the specific consumer recipient;

receiving at least some offer identification data and consumer identification data from the specific consumer recipient at the VRU, wherein the consumer identification data is received from a communication device identified with a telephone number and wherein the consumer identification data comprises the address of the specific consumer recipient;

identifying the telephone number using automatic number identification (ANI);

identifying a location of the specific consumer recipient based on the identified telephone number;

using data received at the VRU to query the offer database to identify other offers targeted to the specific consumer recipient and data associated with those other targeted offers, including consumer identity verification data;

verifying the identity of the specific consumer recipient based on the consumer identification data and the consumer identity verification data comprising verifying the address based on the identified location;

transferring the communication link from the VRU to a live agent; and providing the live agent with: (a) information received from the specific consumer at the VRU, and (b) data from the query of the offer database including data regarding other targeted offers prior to the live agent commencing communication with the consumer.

2. The method of claim 1, further comprising:

issuing a request to a credit bureau for an approval result returned to the VRU, wherein the providing action further comprises providing the live agent with the results of the credit bureau request.

3. The method of claim 2, wherein the credit bureau request comprises a request for a credit score associated with the specific consumer recipient, and wherein the results of the credit bureau request comprise the credit score.

4. The method of claim 3, wherein the credit score is based on the consumer identification data.

5. The method of claim 1, wherein the consumer identification data is associated with the specific consumer recipient and comprises at least one selected from the group consisting of a name, an email address, an income, an amount of assets, a monthly housing payment, an address history, and an employment history.

6. The method of claim 1, wherein the act of receiving consumer identification data comprises identifying words spoken by the specific consumer recipient using voice recognition.

7. The method of claim 1, wherein the specific offer comprises at least one of the following:

an offer to establish an account;
an offer to purchase a certificate of deposit;
an offer to purchase a stored value card;
an offer to obtain financing;
an offer to obtain account protection;
an offer to enroll in a travel program; and
an offer to enroll in a rewards program.

8. The method of claim 1, wherein the data used at the VRU to query the database comprises the offer identification data.

9. The method of claim 8, wherein the offer identification data comprises an offer identifier, wherein the offer identifier is pre-associated with the specific offer and the specific consumer recipient.

10. A computer-implemented method for processing applications for products or services based on solicited offers made to consumers, comprising:

communicating, using a computer, a plurality of offers to a plurality of consumer recipients, each offer being identified by a solicitation identifier and an offer identifier;

storing offer information of said offers in an offer database that further includes consumer identification information associated with the consumer recipients and wherein the consumer identification data comprises words spoken by the specific consumer recipient indicating a street address;

identifying a zip code associated with the specific consumer recipient;

identifying one or more streets associated with the identified zip code;

identifying the street address based on the identified zip code and the identified one or more streets;

receiving a response to a specific offer from a specific consumer recipient at a VRU via a communication link with the specific consumer recipient;

receiving at least some offer identification data and consumer identification data from the specific consumer recipient at the VRU;

using data received at the VRU to query the offer database to identify other offers targeted to the specific consumer recipient and data associated with those other targeted offers, including consumer identity verification data;

verifying the identity of the specific consumer recipient based on the consumer identification data and the consumer identity verification data;

transferring the communication link from the VRU to a live agent; and providing the live agent with: (a) information received from the specific consumer at the VRU, and (b) data from the query of the offer database including data regarding other targeted offers prior to the live agent commencing communication with the consumer.

11. The method of claim 10, wherein the act of identifying the street address comprises:

identifying speech recognition information based on the words spoken by the specific consumer recipient;

comparing the speech recognition information to the one or more streets associated with the zip code.

12. The method of claim 11, wherein the act of identifying the street address comprises identifying a specific street that is most closely related to the speech recognition information.

13. The method of claim 1, wherein the acts of (i) receiving a response, (ii) receiving consumer identification information, (iii) using data received at the VRU, (iv) verifying the identity of the specific consumer recipient, (v) transferring the communication link, and (vi) providing the live agent information and data, all occur during a single phone call.

14. The method of claim 13, further comprising:

providing one or more additional offers to the specific consumer recipient during the single phone call.

15. The method of claim 13, wherein the one or more additional offers are selected to be provided to the specific consumer recipient based on at least one selected from the list comprising the specific consumer recipient data, the consumer identification data, the data regarding other targeted offers, and pre-qualification information of the specific consumer recipient.

16. A computer-implemented method for processing applications for products or services based on solicited offers made to consumers, comprising:

communicating, using a computer, a plurality of offers to a plurality of consumer recipients, each offer being identified by a solicitation identifier and an offer identifier;

storing offer information of said offers in an offer database that further includes consumer identification information associated with the consumer recipients;

receiving a response to a specific offer from a specific consumer recipient at a VRU via a communication link with the specific consumer recipient;

receiving at least some offer identification data and consumer identification data from the specific consumer recipient at the VRU;

using data received at the VRU to query the offer database to identify other offers targeted to the specific consumer recipient and data associated with those other targeted offers, including consumer identity verification data;

storing prior speech recognition data of the specific consumer recipient, wherein the prior speech recognition data is obtained during a prior communication with the specific consumer recipient;

verifying the identity of the specific consumer recipient based on the consumer identification data and the consumer identity verification data comprising processing the prior speech recognition data;

transferring the communication link from the VRU to a live agent; and providing the live agent with: (a) information received from the specific consumer at the VRU, and (b) data from the query of the offer database including data regarding other targeted offers prior to the live agent commencing communication with the consumer.

17. The method of claim 16, wherein the act of processing the prior speech recognition data comprises comparing the speech recognition data to current speech recognition data.

18. The method of claim 1, further comprising:

checking a pre-approved database, wherein the providing action further comprises providing the live agent with information based on the checking action.

19. The method of claim 1, further comprising:

prompting the customer for consumer identification data, wherein the act of receiving consumer identification data is based on the act of prompting.

20. A method for processing a customer offer, comprising:

distributing an offer to a customer;

receiving a response to the offer from the customer through a customer communication device, wherein the response comprises customer address information, wherein the customer response is received from a telephone associated with a telephone number;

identifying the telephone number using automatic number identification (ANI);

automatically identifying a location of the customer communication device based on the identified telephone number and one or more additional offers that may be targeted to the customer; wherein the act of identifying the location comprises identifying a zip code;

identifying an address of the customer, comprising:

identifying one or more streets associated with the zip code;

receiving street address information from the customer; and comparing the street address information with the one or more streets associated with the zip code;

verifying the customer address information based on the location of the customer communication device;

prompting the customer for personal information, wherein the personal information comprises at least one of a name of the customer, an email address of the customer, a physical address of the customer, an income of the customer, an address history of the customer, and an employment history of the customer;

receiving the personal information from the customer; and providing to a live agent information about the distributed offer and the one or more additional offers that may be targeted to the customer prior to the live agent commencing communication with the customer.

21. The method of claim 20, wherein the offer comprises at least one selected from the group consisting of:

an offer to establish an account;

an offer to purchase a certificate of deposit;

an offer to purchase a stored value card;

an offer to obtain financing;

an offer to obtain account protection;

an offer to enroll in a travel program; and an offer to enroll in a rewards program.

22. The method of claim 20, further comprising:

verifying the personal information.

23. The method of claim 22, wherein the act of verifying the personal information comprises identifying the personal information by using voice recognition to distill words from customer speech.

24. The method of claim 20, further comprising:
passing the personal information to a credit bureau;
receiving a credit score from the credit bureau, wherein the credit score is based on the personal information.

25. The method of claim 24, wherein the personal information comprises at least one of a name of the customer, an email address of the customer, a physical address of the customer, an income of the customer, an address history of the customer, and an employment history of the customer.

26. The method of claim 20, further comprising:
passing customer data to a credit bureau; and
receiving a credit score from the credit bureau, wherein the credit score is based on the customer data.

27. The method of claim 20, wherein the street address information comprises speech recognition information, and wherein the act of comparing the street address information with the one or more streets comprises identifying a specific street that is most closely related to the speech recognition information.

28. The method of claim 20, wherein the acts of receiving, identifying and providing occur during a single phone call.

29. The method of claim 28, wherein the one or more additional offers are selected based on at least one of the customer data, personal information received from the customer, and a credit score associated with the customer.

30. A method for processing a customer offer, comprising:
distributing an offer to a customer;
receiving a response to the offer from the customer through a customer communication device, wherein the response comprises customer address information;
automatically identifying the location of the customer communication device and one or more additional offers that may be targeted to the customer;
verifying the customer address information based on the location of the customer communication device;
storing speech recognition data of the customer;
verifying the identity of the customer based on the speech recognition data; and
providing to a live agent information about the distributed offer and the one or more additional offers that may be targeted to the customer prior to the live agent commencing communication with the customer.

* * * * *

UNITED STATES PATENT AND TRADEMARK OFFICE
CERTIFICATE OF CORRECTION

PATENT NO.        : 8,533,030 B1
APPLICATION NO.   : 10/928181
DATED             : September 10, 2013
INVENTOR(S)       : Nitin Dhir et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1807 days.

Signed and Sealed this
Twenty-eighth Day of July, 2015

Michelle K. Lee
*Director of the United States Patent and Trademark Office*